United States Patent [19]

Hans et al.

[11] Patent Number: 4,534,749

[45] Date of Patent: Aug. 13, 1985

[54] PULLEY

[75] Inventors: Rudiger Hans, Niederwerrn; Manfred Brandenstein, Eussenheim; Wolfgang Friedrich, Schweinfurt; Roland Haas, Lendershausen, all of Fed. Rep. of Germany

[73] Assignee: SKF GmbH, Schweinfurt, Fed. Rep. of Germany

[21] Appl. No.: 493,367

[22] Filed: May 10, 1983

[30] Foreign Application Priority Data

May 11, 1982 [DE] Fed. Rep. of Germany ....... 3217579

[51] Int. Cl.³ .............................................. F16H 55/36
[52] U.S. Cl. .................................... 474/174; 474/180
[58] Field of Search ............... 474/174, 176, 166, 179, 474/180, 198, 199, 165

[56] References Cited

U.S. PATENT DOCUMENTS

| 1,960,282 | 5/1934 | Walker | 474/180 X |
| 2,680,380 | 6/1954 | Bagley | 474/180 |
| 3,722,310 | 3/1973 | Schultz, Jr. | 474/180 |
| 3,848,309 | 11/1974 | Nuss | 474/180 X |
| 3,962,926 | 6/1976 | Kotlar | 474/180 X |

Primary Examiner—Stephen J. Novosad
Assistant Examiner—Thuy M. Bui
Attorney, Agent, or Firm—Daniel M. Rosen

[57] ABSTRACT

A roller casing for a pulley is comprised of coaxial ring halves mounted one over the other. The diameter of the running surface can be varied without varying the bearing size by employing corrugations in the circumferential direction, or by providing lateral radially outwardly directed rims on the inner ring part. Alternatively the iner ring may be comprised of two ring halves having their central parts directed toward one another.

11 Claims, 4 Drawing Figures

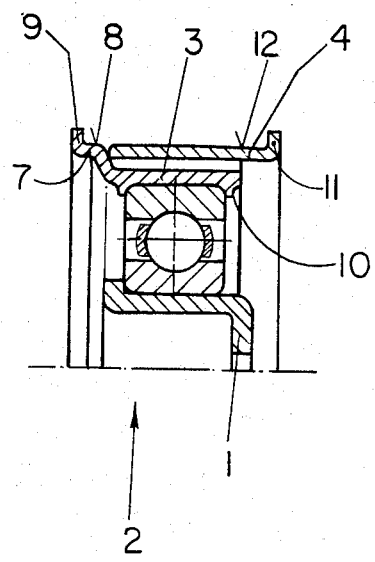
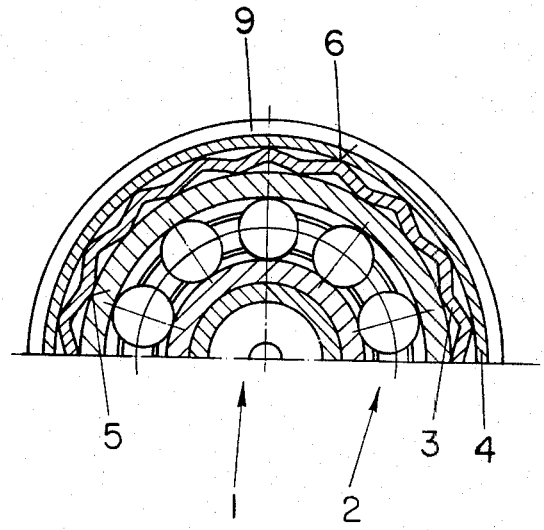
Fig. 1
Fig. 2

PULLEY

This invention relates to a pulley, especially a tension roller for belts, consisting of a support body and a roller casing or shell rotatably mounted on the support body by means of a bearing.

A pulley of this type is disclosed, for example, in DE-GM 8112197 (or GB 2,097,509). In this arrangement a sheet metal roller casing is mounted on the outer ring of a bearing, and affixed thereto. It encircles the outer ring with the thickness of the sheet metal used for the casing. This arrangement functions properly and is economically produceable. In many cases, however, the running surface of the roller casing must have a proportionally larger outer diameter in order to sufficiently embrace the belt on the drive roller, or to not exceed the bending characteristics of the belt. In this arrangement, in order to change the diameter, both the bearing and support body must be enlarged. This solution is generally expensive. In another known arrangement, for example as disclosed in DE-GM 8120072 (or G.B. 2,103,332), the roller casing is radially split, with the two halves having substantially U-shaped cross-sections, the halves being mounted on a flange of the outer ring and engaging one another with sections connected by two flanges. The running surface of the roller casing in this case around the radial dimension of the section is larger than the outer diameter of the bearing. In this construction the diameter of the running surface theoretically can be increased as desired, however, the central section of the U-profile cannot be as short as desired, so that a non-solvable bending problem arises.

The prior art as discussed above hence does not provide a solution to the problem of simply and economically varying the diameter of the running surface.

It is therefore the object of the invention to produce a pulley of the above type that enables the simple and economical modification of the diameter of the running surface without requiring the use of sheet metal having increased thickness.

Briefly stated, in accordance with invention, this object is solved by the provision of a roller casing having ring parts coaxially arranged one over the other.

The two ring parts may be so formed, for example, that the first ring part is mounted with a press fit on the bearing and the second is mounted likewise with a press fit on the first ring part. In the area of the width of the bearing there is therefore a double sheet metal thickness. The roller casing, however, is ordinarily wider than the bearing and moreover has a radially directed guide flange for the belt. The outer section can thus have a single sheet metal thickness. In this arrangement the roller casing is comprised of two ring parts which may be simply and economically produced and may be assembled with minimum expense. Advantageously the running surface of the roller casing has an outer diameter that is larger by about one sheet metal thickness, so that the roller may be adapted to many uses without requiring a change in the bearing. Moreover the arrangement in accordance with the invention is only slightly heavier than a simple roller casing.

In accordance with a further feature of the invention the inner ring part has circumferentially distributed radial projections formed from the material of the surface, for example, by a stamping, bending or pressing process. The diameter of the running surface can be further enlarged in this arrangement while still using a bearing of the same size, without a greater than proportional increase in weight. The inner ring part has, for example circumferentially distributed radially outwardly pressed tongues in the region of the seating surface for the outer ring part. The outer ring part may thereby have a larger diameter and may be mounted on these tongues. The diameter of the running surface may be varied by varying the radial dimensions of the pressed-out tongues. Understandably it is also possible to press out tongues radially inwardly on the inner ring part to produce the seating surface for the bearing.

In a further embodiment of the invention the inner ring part is corrugated in the circumferential direction.

In this case the radially inner vertices of the corrugations engage the outer surface of the bearing and the radially outer vertices support the outer cylindrical ring part of the roller casing. Preferably a relatively large number of corrugations are distributed about the entire bearing circumference in order to produce a sufficiently uniform support. The support lines thereby extend in the axial direction so that the outer ring part is positively supported in all force directions. It is thereby possible to employ a larger diameter ring for the running surface of the roller casing, while still using a bearing of the same size, in accordance with the invention, by variation of the radial spacing between the vertices of the corrugations.

In a further embodiment of the invention the inner ring part of the roller casing has lateral radially outwardly directed flanges and the outer ring part with the running surface is mounted thereon.

The inner ring part is mounted, for example, on the bearing and the outer ring part is mounted on the outer surface of the edges of the flanges, and affixed thereto as the case may be. Consequently the two ring parts together have a tube shaped cross section.

By varying the height of the edge of the inner ring part, the diameter of the running surface can be varied without requiring the use of a different bearing.

In accordance with a still further feature of the invention the inner ring part is comprised of two ring parts having substantially U-shaped cross sections, with the bore surfaces thereof serving as seating surfaces for the bearing and the outer surfaces serving as seating surfaces for the outer ring part.

In this arrangement the central section of the U-shaped profiles of both ring halves determines the diameter of the running surface, i.e., of the entire outer ring part. The ring halves are, for example, mounted on the outer surface of the bearing such that the bottoms of the U-shaped profiles face one another. In other applications in which, for example, very wide running surfaces must be provided, the central arms of the U-shaped profiles can be inclined to the radial plane of the bearing, with the outer arms being parallel and axially displaced to produce the seating surfaces for the bearing and outer ring.

In order that the invention may be more clearly understood it will now be disclosed in greater detail with reference to the accompanying drawings, wherein:

FIG. 1 is a partial longitudinal section of a pulley having a corrugated inner ring part;

FIG. 2 is a partial transverse cross section of the pulley illustrated in FIG. 1;

Figure 3:
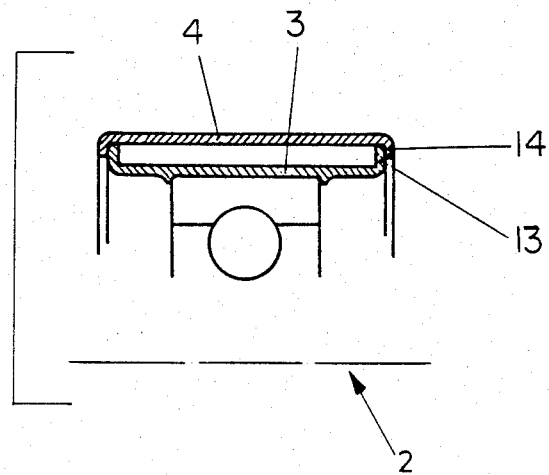
FIG. 3 is a partial longitudinal section of a pulley having a tube-shaped cross section roller surface.

The pulley illustrated in FIGS. 1 and 2 consists of a support body 1, a ball bearing 2 and a roller casing or sleeve affixed thereon. The roller casing comprises two ring parts 3, 4, of which the inner part is corrugated over the width of the ball bearing 2. There are a large number or corrugations distributed about the entire circumference of the inner ring part, so that a correspondingly large number of vertices 5, 6 support the outer ring part 4 on the surface of the ball bearing 2. The vertices 5, 6 extend in the axial direction, so that the support is linear. A generally radially extending annular section 7 of the inner ring part extends beyond the corrugated region, and is then bent over to extend axially at the radial level of the outer vertices 6 of the corrugations to form a supplementary small section 8 of the running surface. The free end of the inner ring part 3 connected to the section 8 is bent to extend radially outwardly, so that a guide edge 9 for a belt (not shown) is formed. The inner ring part 3 can be axially held on the ball bearing 2 by pressing radially inwardly extending projections 10 from the material, in a known manner. An outer ring part 4 of the roller casing is mounted on the outer vertices 6 of the corrugations, the outer ring part being cylindrical and without corrugations. In addition to the guide rim 9 of the inner ring part 3, a corresponding guide rim 11 is provided at the opposite free end of the outer ring part 4. The ring surface 12 of this ring part 4 and the supplementary small section 8 of the inner ring part 3 have the same outer diameter and together define the total width of the running surface for the belt. The two ring parts 3, 4 can be ensured against unintentional axial separation by radially extending projections (not shown) pressed from the material of one or both of the ring parts.

The roller casing illustrated in FIG. 3 is comprised of an inner ring part 3 with a U-shaped cross section, with a seating surface for a roller bearing 2 being formed at the central section of the inner bore surface of the U-shaped profile. The lateral flanges 13 of the U-shaped profile are directed radially outwardly and form the seating surface for the outer ring part 4 with their small outer surfaces of the width of the sheet metal thickness. The free ends 14 of the outer ring part 4 are bent around to extend radially inwardly and abut the side surfaces of the lateral flanges 13.

Figure 4:
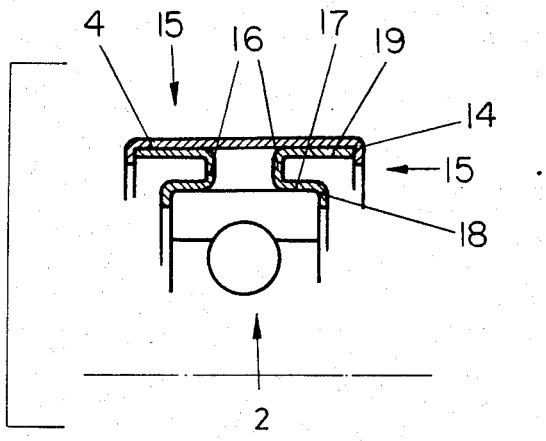
FIG. 4 is a partial longitudinal section of a pulley with a separated inner ring part.

In the pulley illustrated in FIG. 4, the inner ring part is separated into two ring halves 15 having generally U-shaped cross sections, with the central sections 16 of the U-shaped profiles being directed toward one another. The inner flanges 17 of the U-shaped profiles are mounted on the outer surface of a bearing 2 and have annular inwardly directed flanges 18 which engage the side surfaces of the bearing 2. The outer ring part 4 is mounted on the outer surfaces of the ring halves 15 on the seat formed by the outer flanges 19 of the U-shaped profiles, the free ends 14 of the outer ring part being bent inwardly around the sides of the flanges 19. This results thereby in a bearing-roller casing assembly held together by press or interference fit. The ring parts 4, 15 can be prefabricated and require no substantial additional effort for affixing to the bearing 2, and to one another, during assembly.

While the invention has been disclosed with reference to a limited number of embodiments, it will be apparent that variations and modifications may be made therein within the concept of the invention. It is therefore intended in the following claims to cover each such modification and variation as falls within the true spirit and scope of the invention.

What is claimed is:

1. In a pulley comprised of a support body and a roller casing rotatably mounted thereon by a bearing; the improvement wherein the roller casing is comprised of an outer ring part coaxially over one inner ring part, said inner ring having radially outwardly directed projections radially supporting said outer ring.

2. The pulley according to claim 1, wherein the inner ring part of the roller casing has lateral radially outwardly directed flanges and the outer ring part has a running surface thereon and is mounted outwardly over said flanges.

3. The pulley according to claim 1, wherein the inner ring part is comprised of two substantially U-shaped cross-section ring halves, the bore surface thereof defining a seating surface for the bearing and the outer surface thereof defining a seating surface for the outer ring part.

4. In a pulley comprised of a support body, a rolling bearing having an inner ring mounted on a support body, and a roller casing mounted on an outer ring of the bearing for rotation with respect to the support body, the improvement wherein the roller casing comprises an inner sheet metal ring part mounted on the outer ring of said bearing, and an outer sheet metal part coaxially supported by said inner ring part and defining an outer running surface of the roller casing, said inner ring having radially outwardly directed projections radially supporting said outer ring.

5. The pulley of claim 4 wherein said inner ring part is generally U-shaped with the inner radial portion forming a seating surface for the outer ring of the bearing, the end portions of the inner ring part being flanged radially outwardly to define annular seating surfaces for the outer ring part that are of a width equal to the thickness of the sheet metal forming said inner ring part.

6. The pulley of claim 5 wherein said outer ring part is provided with radially inwardly extending flanges abutting the flanges of the inner ring part.

7. The pulley of claim 4 wherein said inner ring part is comprised of first and second annular elements having U-shaped cross sections, with the central portions of the U-shaped cross-section being directed toward one another, the inner legs of the U-shaped cross section defining a seating surface for the outer ring of the bearing and the outer legs defining a seating surface for the outer ring part of the roller casing.

8. In a pulley comprised of a support body and a roller casing rotatably mounted thereon by a bearing; the improvement wherein the roller casing is comprised of an outer ring part coaxially over an inner ring part, and wherein said inner ring part has circumferentially distributed radial projections formed therein from the material of the inner ring part.

9. In a pulley comprised of a support body and a roller casing rotatably mounted thereon by a bearing; the improvement wherein the roller casing is comprised of an outer ring part coaxially over an inner ring part, and wherein said inner ring part is corrugated in the circumferential direction.

10. In a pulley comprised of a support body, a rolling bearing having an inner ring mounted on the support body, and a roller casing mounted on outer ring of the bearing for rotation with respect to the support body, the improvement wherein the roller casing comprises an inner sheet metal ring part mounted on the outer ring of said bearing, and an outer sheet metal ring part coaxially supported by said inner ring part and defining an outer running surface of the roller casing, said inner ring part having an axial extension defining a supplemental running surface axially adjacent and of the same diameter as said outer ring part.

11. In a pulley comprised of a support body, a rolling bearing having an inner ring mounted on the support body, and a roller casing mounted on the outer ring of the bearing for rotation with respect to the support body, the improvement wherein the roller casing comprises an inner sheet metal ring part mounted on the outer ring of said bearing, and an outer sheet metal ring part coaxially supported by said inner ring part and defining an outer running surface of the roller casing, said inner ring part being circumferentially corrugated with the inner vertices abutting the outer ring of the bearing and the outer vertices abutting and defining a seating surface for the outer ring part.

* * * * *

UNITED STATES PATENT AND TRADEMARK OFFICE
CERTIFICATE OF CORRECTION

PATENT NO. : 4,534,749

DATED : August 13, 1985

INVENTOR(S) : Rudiger Hans, et al

It is certified that error appears in the above-identified patent and that said Letters Patent is hereby corrected as shown below:

Column 3, line 6, omit "or" and insert --of--.

Signed and Sealed this

Twenty-eighth Day of October, 1986

[SEAL]

Attest:

DONALD J. QUIGG

*Attesting Officer*   *Commissioner of Patents and Trademarks*